(12) United States Patent
Lin et al.

(10) Patent No.: US 9,516,984 B2
(45) Date of Patent: Dec. 13, 2016

(54) POSITIONING SYSTEM OF SWEEPER AND POSITIONING METHOD OF THE POSITIONING SYSTEM

(71) Applicants: KINPO ELECTRONICS, INC., New Taipei (TW); CAL-COMP ELECTRONICS & COMMUNICATIONS COMPANY LIMITED, New Taipei (TW)

(72) Inventors: Yu-Ta Lin, New Taipei (TW); Chuan-Wang Chang, New Taipei (TW); Ming-Wei Chuang, New Taipei (TW)

(73) Assignees: KINPO ELECTRONICS, INC., New Taipei (TW); CAL-COMP ELECTRONICS & COMMUNICATIONS COMPANY LIMITED, New Taipei (TW)

(*) Notice: Subject to any disclaimer, the term of this patent is extended or adjusted under 35 U.S.C. 154(b) by 127 days.

(21) Appl. No.: 14/674,166

(22) Filed: Mar. 31, 2015

(65) Prior Publication Data

US 2016/0198919 A1 Jul. 14, 2016

(30) Foreign Application Priority Data

Jan. 12, 2015 (TW) .............................. 104100924 A

(51) Int. Cl.
*B25J 5/00* (2006.01)
*A47L 11/40* (2006.01)
(Continued)

(52) U.S. Cl.
CPC ......... *A47L 11/4011* (2013.01); *A47L 11/4066* (2013.01); *G01S 3/783* (2013.01);
(Continued)

(58) Field of Classification Search
CPC .................................. B25J 5/00; H05B 37/02
See application file for complete search history.

(56) References Cited

U.S. PATENT DOCUMENTS 4,996,468 A * 2/1991 Field ..................... G01S 17/936
    15/319
7,328,088 B2 2/2008 Kim et al.
(Continued)

FOREIGN PATENT DOCUMENTS

CN      101358714 A      2/2009
CN      103399298 A      11/2013
(Continued)

OTHER PUBLICATIONS

Office Action date Dec. 8, 2015 of the corresponding Taiwan patent application.

*Primary Examiner* — Thomas Tarcza
*Assistant Examiner* — Alex C Dunn
(74) *Attorney, Agent, or Firm* — Chun-Ming Shih; HDLS IPR Services

(57) ABSTRACT

A positioning system comprises a sweeper and a positioning device arranged on a ceiling. The sweeper has a lighting component for emitting light. The positioning device at least has a height measuring unit and a plurality of light-sensitive units. The positioning device measures a vertical distance between the positioning device and a floor through the height measuring unit. The positioning device receives the light emitted from the emitting light of the sweeper through the light-sensitive units, and calculates an oblique distance between the positioning device and the sweeper based on different strengths of the light respectively received from each of the plurality of light-sensitive units. Therefore, the positioning device can calculates a parallel distance between the positioning device and the sweeper based on the vertical (Continued)

distance and the oblique distance, and further determines a related position of the sweeper opposite to the positioning device.

16 Claims, 7 Drawing Sheets

(51) Int. Cl.
*G01S 3/783* (2006.01)
*G01S 5/00* (2006.01)
*G01S 5/16* (2006.01)
*G01S 11/12* (2006.01)

(52) U.S. Cl.
CPC .............. *G01S 5/0054* (2013.01); *G01S 5/16* (2013.01); *G01S 11/12* (2013.01); *A47L 2201/04* (2013.01)

(56) References Cited

U.S. PATENT DOCUMENTS

| | | | | |
|---|---|---|---|---|
| 8,237,375 B2* | 8/2012 | Huang | ............... | H05B 37/0227 315/149 |
| 8,306,662 B2* | 11/2012 | Kim | ................ | G01S 7/495 356/28 |
| 8,427,632 B1* | 4/2013 | Nash | ................ | G01C 3/08 348/135 |
| 8,656,550 B2* | 2/2014 | Jones | ................ | A47L 5/30 15/319 |
| 8,671,507 B2* | 3/2014 | Jones | ................ | A47L 5/30 15/319 |
| 8,892,251 B1* | 11/2014 | Dooley | ............... | A47L 11/4011 700/245 |
| 2005/0213082 A1* | 9/2005 | DiBernardo | ............ | G01S 5/163 356/139.03 |
| 2011/0202175 A1* | 8/2011 | Romanov | ............ | A47L 11/4011 700/250 |
| 2014/0024999 A1* | 1/2014 | Levien | .................... | G05D 1/00 604/66 |
| 2016/0227634 A1* | 8/2016 | Engelen | ............ | H05B 37/0245 |

FOREIGN PATENT DOCUMENTS

| | | |
|---|---|---|
| CN | 103543434 A | 1/2014 |
| CN | 103983945 A | 8/2014 |
| CN | 104224062 A | 12/2014 |
| JP | 2009229458 A | 10/2009 |
| TW | 1415590 B | 11/2013 |

* cited by examiner

POSITIONING SYSTEM OF SWEEPER AND POSITIONING METHOD OF THE POSITIONING SYSTEM

BACKGROUND OF THE INVENTION

1. Technical Field

The technical field relates to a positioning system of a sweeper, and a positioning method for the positioning system.

2. Description of Prior Art

Recently, the market presents a sweeper, which can be used for cleaning the indoor space automatically by itself, and the trouble of the traditional user which needs to clean up manually by using a broom or a vacuum cleaner is avoided.

This kind of sweeper usually has a specific positioning system for efficient cleaning. By using the positioning system, the sweeper not only knows its current position, but also records that the current position is already cleaned or not. Therefore, the sweeper will not get lost during the cleaning actions, or clean the same position which was already cleaned. As a result, the cleaning efficiency is raised because of the sweeper.

General speaking, the sweeper usually achieves the above mentioned positioning function via an embedded positioning device. However, the most-common positioning device (such as global positioning system (GPS) device) is too expensive, if the sweeper mentioned above is equipped with this kind of positioning device, the cost of the sweeper will raise substantially, and it will reduce the purchasing desire of the user.

Please refers to FIG. 1, which is a schematic diagram of positioning system according to related art. FIG. 1 discloses an indoor space 1, the indoor space 1 comprises a floor 11 and a ceiling 12, and a traditional emitter 2 and sweeper 4 are put on the floor 11.

As shown in FIG. 1, the emitter 2 has a lighting component 21 arranged on a top face, the lighting component 21 emits upward a vertical light externally for forming a fixed orientation spot 3 on the ceiling 12. The sweeper 4 has a detecting component 41 thereon for detecting the light of the orientation spot 3.

In the related art, the position of the orientation spot 3 is fixed, so the sweeper 4 regards the orientation spot 3 as the Polaris, and executes a positioning action according to the orientation spot 3 as the same as human uses the Polaris to do so. Therefore, no matter where the sweeper 4 is, it can determine the current position approximately via detecting the orientation spot 3.

However, if the sweeper 4 uses the above method to execute the positioning action, it can only determine an approximate position according to the orientation spot 3. More specifically, in the related art, the sweeper 4 cannot know an exactly position directly, so the positioning accuracy is not so well. Further, if the emitter 2 needs to record the cleaning actions of the sweeper 4 (for example, which positions are cleaned completely), it needs to wait for the sweeper 4 passively until the sweeper 4 completes determining its current position and reports the position information to the emitter 2. The above method is not so convenient for the user who needs to record the detailed cleaning actions of the sweeper 4.

SUMMARY OF THE INVENTION

The disclosure is directed to a positioning system and a positioning method of a sweeper, which can execute positioning actions with high accuracy through low cost of components, so as to raise the cleaning efficiency and reduce the cleaning time.

In one of the exemplary embodiments, the positioning system comprises a sweeper and a positioning device arranged on a ceiling. The sweeper has a lighting component for emitting light. The positioning device at least has a height measuring unit and a plurality of light-sensitive units. The positioning device measures a vertical distance between the positioning device and a floor through the height measuring unit. The positioning device receives the light emitted from the emitting light of the sweeper through the light-sensitive units, and calculates an oblique distance between the positioning device and the sweeper based on different strengths of the light respectively received from each of the plurality of light-sensitive units. Therefore, the positioning device can calculates a parallel distance between the positioning device and the sweeper based on the vertical distance and the oblique distance, and further determines a related position of the sweeper opposite to the positioning device.

Comparing with related arts, the positioning device in this disclosure can calculate the related position of the sweeper according to the light emitted from the sweeper, so the sweeper will not get lost or re-clean the same area which was already cleaned by reference to the related position. Therefore, the sweeper in this disclosure can do the cleaning actions more efficient, and it can reduce the cleaning time and battery usage, and further solve the problem that the cleaning time of the sweeper is longer than the using time of the battery and the sweeper needs to get charge many times to complete an entire cleaning task for a whole space.

Besides, this disclosure calculates the related position of the sweeper through the interaction between the lighting component of the sweeper and the light-sensitive units of the positioning device. Comparing with the technical solutions of the related art that embedding the positioning device in the sweeper, this disclosure does not cost so much and is advantageous in market development.

Furthermore, the positioning device in this disclosure is arranged on the ceiling of the cleaned space, so it can receive the light emitted from the sweeper to execute the positioning actions based on a smallest interference. At the same time, the positioning device covers the biggest range of the space from the ceiling, so the space can be cleaned by multiple sweepers simultaneously, and this disclosure can use a single positioning device to execute the positioning actions for the multiple sweepers simultaneously. Therefore, the cost of the user for efficiently using the sweeper is reduced.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
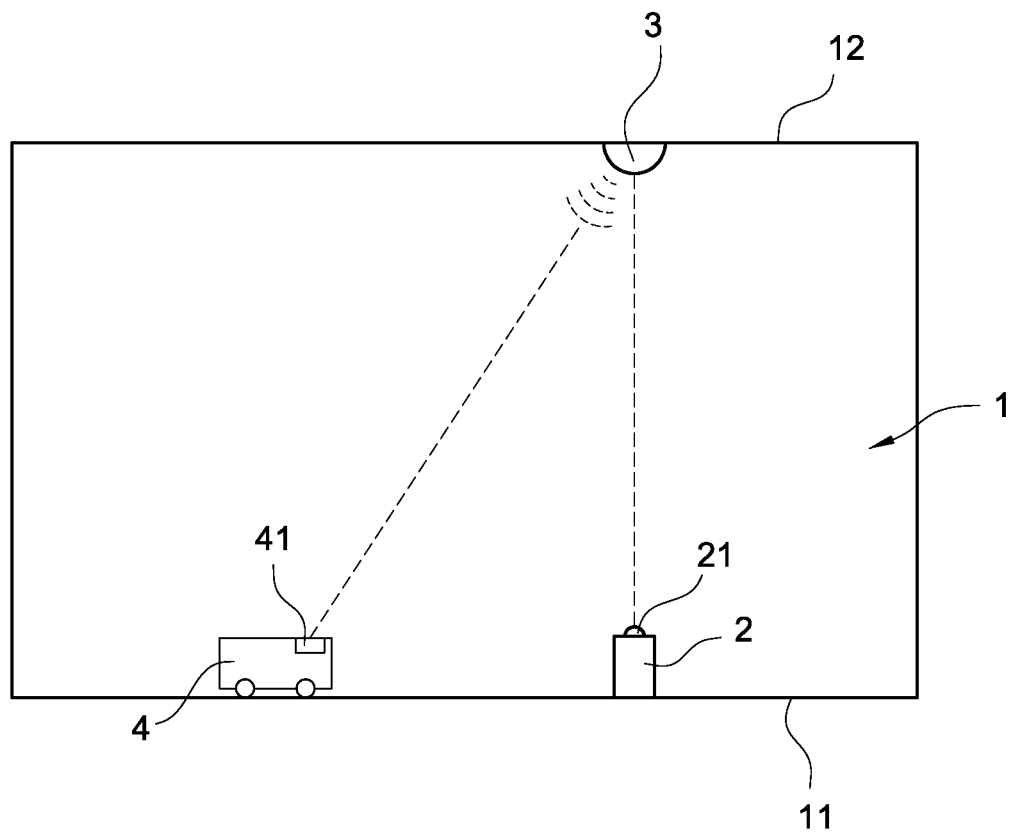
FIG. 1 is a schematic diagram of positioning system according to related art.
Figure 2:
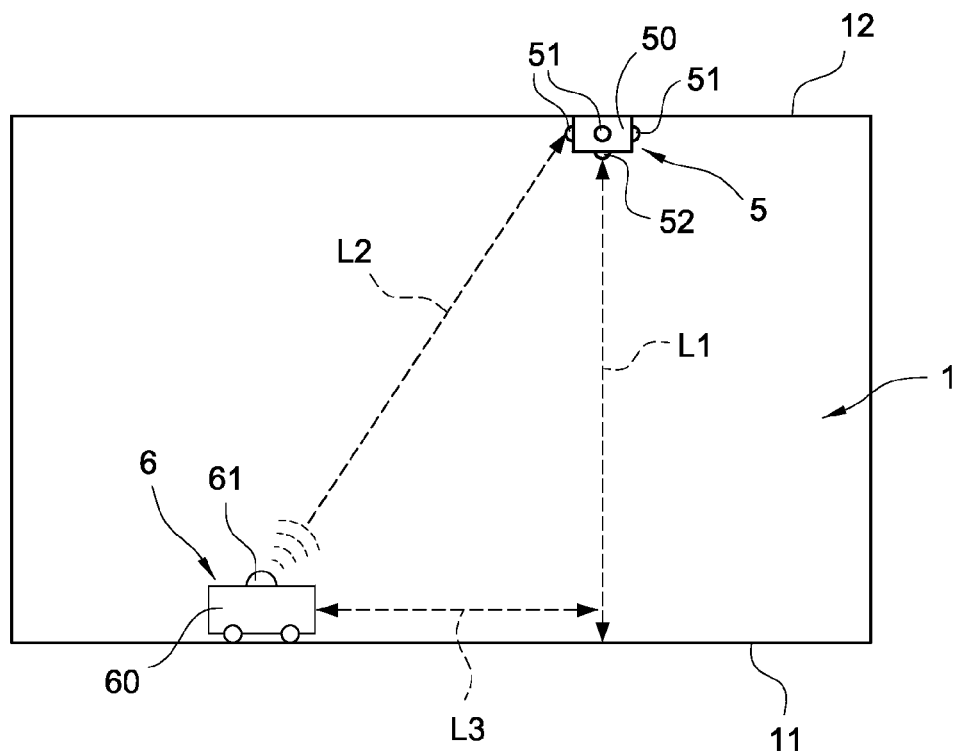
FIG. 2 is a schematic diagram of positioning system of sweeper of a first embodiment according to the present disclosure.

FIG. 2 is a schematic diagram of positioning system of sweeper of a first embodiment according to the present disclosure. This invention discloses a sweeper positioning system (refers to as the system hereinafter), comprises a positioning device 5 and a sweeper 6. The system in this disclosure is used in an indoor space 1 which is demanded to clean, wherein the positioning device 5 is arranged on a ceiling 12 of the indoor space 1, and the sweeper 6 is put on a floor 11 of the indoor space 1 for executing cleaning actions automatically.

Figure 4:
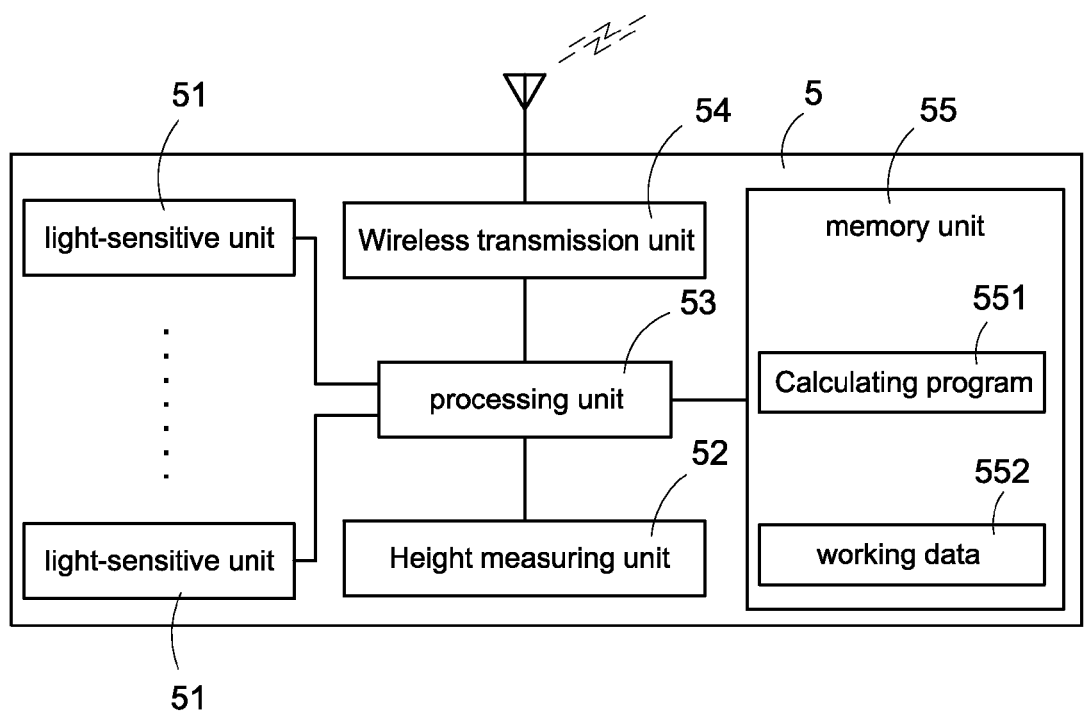
FIG. 4 is a block diagram of positioning device of a first embodiment according to the present disclosure.

As shown in FIG. 2, the positioning device 5 at least has a plurality of light-sensitive units 51 and a height measuring unit 52. The height measuring unit 52 is used to measure a vertial distance L1 between the positioning device 5 and the floor 11, the plurality of light-sensitive units 51 are used to measure an oblique distance L2 between the positioning device 5 and the sweeper 6. Therefore, a processing unit 53 (as shown in FIG. 4) of the positioning device 5 can calculate a parallel distance L3 between the positioning device 5 and the sweeper 6 in accordance with the vernal distance L1 and the oblique distance L2.

In this embodiment, the oblique distance L2 comprises a linear distance between the positioning device 5 and the sweeper 6, and comprises a direction of the sweeper 6 opposite to the positioning device 5. The positioning device 5 calculates a related position of the sweeper 6 opposite to the positioning device 5 based on the direction of the oblique distance L2 and the parallel distance L3. The positioning device 5 sends the related position to the sweeper 6 wirelessly, so the sweeper 6 can execute the cleaning actions accurately according to the received related position (i.e., moves to an area which is not been cleaned yet).

The sweeper 6 has at least one lighting component 61 arranged thereon, for emitting light externally. The positioning device 5 uses the plurality of light-sensitive units 51 to receive the light emitted from the lighting component 61 respectively, and determines the above mentioned oblique distance L2 (comprises the linear distance and the direction) based on different light strengths obtained respectively by each of the plurality of light-sensitive units 51.

It should be mentioned that the amount of the lighting component 61 in FIG. 2 is depicted in one for example, however, the sweeper 6 can arrange more than one lighting component 61 thereon in accordance with the brightness purpose, not intended to limit the scope of the present invention. Besides, the sweeper 6 can control the lighting component 61 to keep emitting the light for the positioning device 5 to continually execute the positioning actions. Else, the sweeper 6 can also control the lighting component 61 to emit the light intermittently (i.e., only emits the light when the positioning actions is needed), so as to save the power of the sweeper 6.

Generally, the lighting component 61 is light emitting diode (LED), and is arranged on a surface of a shell 60 of the sweeper 6. Preferably, the lighting component 61 is arranged on a top surface of the shell 60 of the sweeper 6, therefore, no matter where the sweeper 6 is in the indoor space 1, the positioning device 5 can receive the light emitted from the lighting component 61, and the positioning accuracy is enhanced. It should be mentioned that if the sweeper 6 has multiple lighting components 61, the wavelength of the light emitted from the multiple lighting components 61 must be the same, so the positioning device 5 can know that the light emitted from the multiple lighting components 61 are related to the same sweeper 6.

Figure 3:
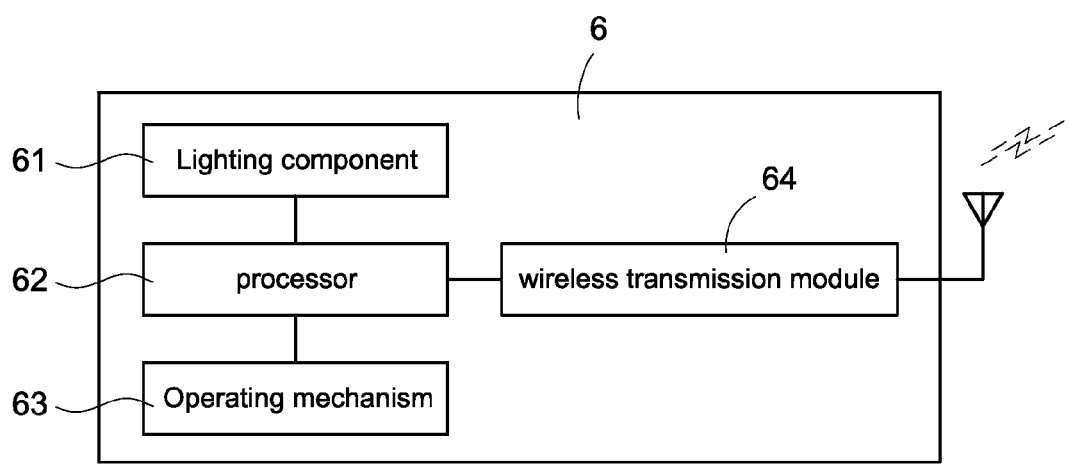
FIG. 3 is a block diagram of sweeper of a first embodiment according to the present disclosure.

FIG. 3 is a block diagram of sweeper of a first embodiment according to the present disclosure. As shown in FIG. 3, the sweeper 6 comprises the lighting component 61, a processor 62, an operating mechanism 63 and a wireless transmission module 64, wherein the processor 62 is electrically connected with the lighting component 61, the operating mechanism 63 and the wireless transmission module 64.

The processor 62 controls the lighting component 61 to keep emitting the light or only emit the light when it is necessary, so the positioning device 5 can execute the positioning actions for the sweeper 6. Further, the processor 62 controls the operating mechanism 63 for the sweeper 6 to execute specific cleaning actions. The operating mechanism 63 is this disclosure comprises well-known mechanisms in this technical field, such as wheels, motors, carders, vacuum modules, etc., but not limited thereto.

The sweeper 6 connects with the positioning device 5 wirelessly through the wireless transmission module 64, so as to receive the related position of the sweeper 6 wirelessly from the positioning device 5. Therefore, the sweeper 6 can move according to the received related position and execute the cleaning actions more efficient. In this embodiment, the wireless transmission module 64 is Bluetooth transmission module, Zigbee transmission module, Radio Frequency (RF) transmission module, Near Field Communication (NFC) tramission module, etc., but not limited thereto.

FIG. 4 is a block diagram of positioning device of a first embodiment according to the present disclosure. As shown in FIG. 4, the positioning device 5 comprises the plurality of light-sensitive units 51, the height measuring unit 52, the processing unit 53 and a wireless transmission unit 54, wherein the processing unit 53 is electrically connected with the plurality of light-sensitive units 51, the height measuring unit 52 and the wireless transmission unit 54.

After the positioning device 5 boots, the processing unit 53 controls the height measuring unit 52 to measure the vertical distance L1, and controls the multiple light-sensitive units 51 respectively to receive the light emitted from the sweeper 6 for measuring the oblique distance L2. Further, the processing unit 53 calculates the related position of the sweeper 6 (comprises the parallel distance L3 and the direction of the sweeper 6) based on the vertical distance L1 and the oblique distance L2, and transmits the related position to the sweeper 6 wirelessly through the wireless transmission unit 54. In this embodiment, the wireless transmission unit 54 uses the same communication protocol as the wireless transmission module 64 of the sweeper 6, for example, the wireless transmission unit 54 can be Bluetooth transmission unit, Zigbee transmission unit, RF transmission unit or NFC transmission unit, but not limited thereto.

The height measuring unit 52 is an infrared transceiver in this embodiment. More specifically, the height measuring unit 52 is arranged on a bottom of a housing of the positioning device 5 (such as the housing 50 shown in FIG. 2), and is exposed out of the housing 50. When measuring the vertical distance L1, the positioning device 5 controls the height measuring unit 52 to emit downward the infrared to the floor 11, and calculates the vertical distance L1 based on the reflection information (for example, the strength and reflection time of the infrared reflected from the floor 11).

It should be mentioned that the positioning device 5 further comprises a memory unit 55, which is electrically connected to the processing unit 53. The memory unit 55 in this embodiment stores a calculating program 551, the processing unit 53 uses the calculating program 551 to calculate the vertical distance L1, the oblique distance L2, the parallel distance L3, the direction and the related position. Particularly, the calculating program 551 here calculates the parallel distance L3 by executing a trigonometric conversion based on the vertical distance L1 and the oblique distance L2.

The memory unit 55 further stores working data 552, which records finished tasks and unfinished tasks of the sweeper 6, for example, cleaned areas, un-cleaned area, etc. When transmitting the related position to the sweeper 6, the positioning device 5 can transmit the working data 552 to the sweeper 6 in the meantime, so the sweeper 6 can know actually how to execute the cleaning actions. However, the above description is just a preferred embodiment, not intended to limit the scope of the present invention.

Figure 5A:
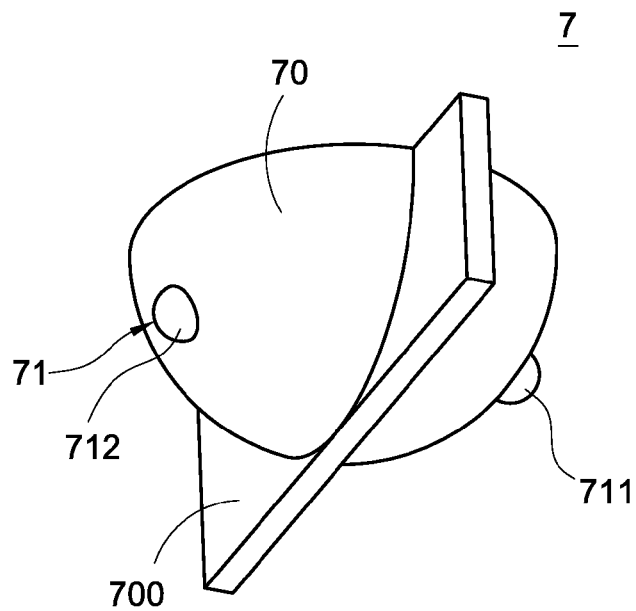
FIG. 5A is an appearance view of positioning device of a first embodiment according to the present disclosure.
Figure 5B:
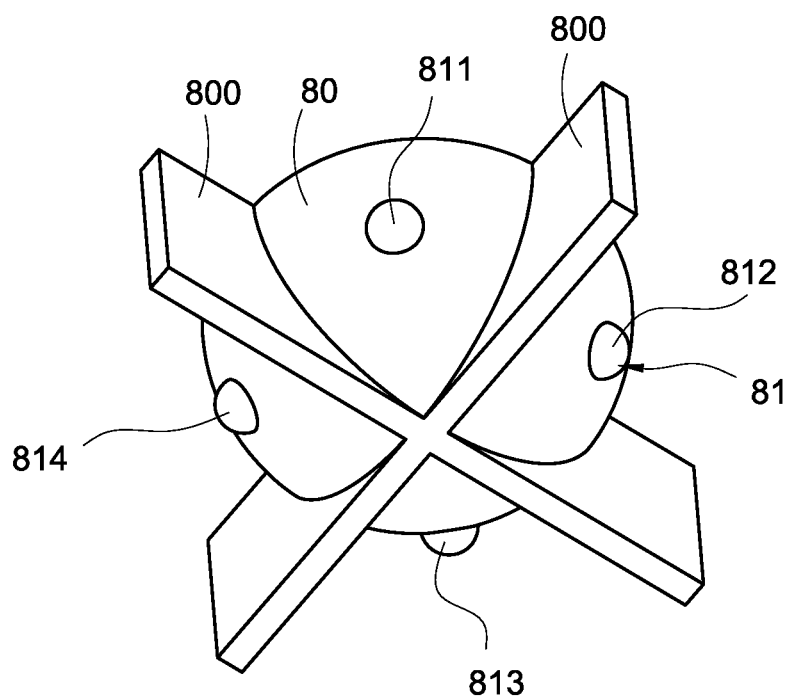
FIG. 5B is an appearance view of positioning device of a second embodiment according to the present disclosure.

FIG. 5A is an appearance view of positioning device of a first embodiment according to the present disclosure. FIG. 5B is an appearance view of positioning device of a second embodiment according to the present disclosure. FIG. 5A discloses other positioning device 7, which has the same components as the above discussed positioning device 5. The difference between the positioning device 7 and the positioning device 5 is the positioning device 7 in this embodiment specifically discloses two light-sensitive units 71 thereon, including a first light-sensitive unit 711 and a second light-sensitive unit 712.

The positioning device 7 further comprises a housing 70, for covering all components of the positioning device 7 (such as the two light-sensitive units 71 and the above mentioned height measuring unit 52, processing unit 53, wireless transmission unit 54 and memory unit 55 of the positioning device 5). The two light-sensitive units 71 are respecitvely arranged on a surface of the housing 70, and exposed out of the housing 70. In this embodiment, the two light-sensitive units 71 are arranged respectively on two side faces of the housing 70, but not limited thereto.

The positioning device 7 further comprises a plurality of separating mechanisms 700. The amount of the plurality of separating mechanisms 700 in this embodiment is two for example, but not limited thereto. The two separating mechanisms 700 together separate two sensitive areas for the positioning device 7, and the first light-sensitive unit 711 and the second light-sensitive unit 712 are respectively arranged on the two sensitive areas. In other words, the plurality of light-sensitive units 71 are arranged according to the plurality of sensitive areas, and the amount of the light-sensitive units 71 is according to the amount of the sensitive areas.

With the arrangement of the two separating mechanisms 700, the two light-sensitive units 711 and 712 are used to represent two different directions (such as left side and right side of the positioning device 7). When executing the positioning actions, the positioning device 7 determines that the sweeper 6 is close to the left side or the right side of the positioing device 7 based on the light strength received respectively by the two light-sensitive units 711 and 712. For example, if the sweeper 6 is more close to the left side of the positioning device 7, the light strength received by the first light-sensitive unit 711 arranged on the left side of the positioning device 7 must be stronger than that received by the second light-sensitive unit 712 arranged on the right side of the positioning device 7.

FIG. 5B discloses another positioning device 8, which has the same components as the above discussed positioning devices 5 and 7. The positioning device 8 in this embodiment comprises a housing 80, a plurality of light-sensitive units 81 and a plurality of separating mechanisms 800, and the difference between the positioning device 8 and the positioning devices 5 and 7 is that the positioning device 8 in this embodiment has four separating mechanisms 800 respectively arranged on four side faces of the housing 80 for separating four sensitive areas for the positioning device 8. Furthermore, the positioning device 8 has four light-sensitive units 81 respectively arranged on the four side faces of the housing 80, which includes a first light-sensitive unit 811, a second light-sensitive unit 812, a third light-sensitive unit 813 and a fourth light-sensitive unit 814. The four light-sensitive units 811-814 in this embodiment are respectively arranged on the four sensitive areas and represent four different directions (such as front, rear, left and right, or east, west, south and north).

In the present invention, the more sensitive areas the positioning devices 5, 7, 8 have, the more accurate the positioning action does. Also, in the technical solutions disclosed in this invention, the positioning devices 5, 7, 8 can separate the sensitive areas through the multiple separating mechanisms 700, 800 and the multiple light-sensitive units 51, 71, 81 respectively arranged thereon, and accomplish the accurate positioning actions with the lighting component 61 of the sweeper 6. Therefore, the manufacturer can reach the best positioning efficiency according to a lowest cost.

Figure 6:
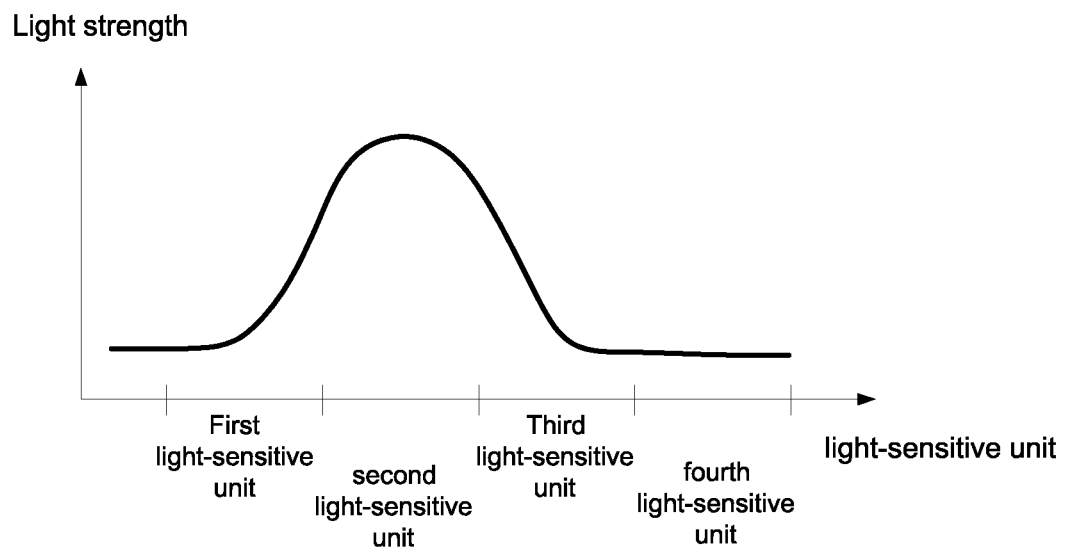
FIG. 6 is a schematic diagram showing light strength of a first embodiment according to the present disclosure.

Please refer to FIG. 6 at the same time, which is a schematic diagram showing light strength of a first embodiment according to the present disclosure. FIG. 6 is used to describe an example by the four light-sensitive units 811-814 of the positioning device 8 shown in FIG. 5B. In the embodiment of FIG. 6, the light strength respectively received by the first light-sensitive unit 811, the second light-sensitive unit 812 and the third light-sensitive unit 813 are stronger, and the fourth light-sensitive unit 814 can barely receive the light. In this case, the positioning device 8 can determine that the sweeper 6 now is more close to the direction where the first light-sensitive unit 811, the second light-sensitive unit 812 and the third light-sensitive unit 813 are arranged (i.e., the sweeper 6 now locates at the other side away from the fourth light-sensitive unit 814).

Furthermore, the light strength received by the second light-sensitive unit 812 is this embodiment is stronger than that received by the first light-sensitive unit 811 and the third light-sensitive unit 813, so the positioning device 8 can determine that the position of the sweeper 6 now is more close to the direction where the second light-sensitive unit 812 is arranged. Therefore, the positioning device 8 can calculate the related position of the sweeper 6 opposite to the positioning device 8 based on the calculated parallel distance L3 and the calculated direction.

In the embodiments of FIG. 5A and FIG. 5B, the positioning devices 7 and 8 are in a circular form, and separate the multiple sensitive areas through the multiple separating mechanisms 700 and 800. In other embodiments, however, the amount of the separating mechanisms 700 and 800 is not necessary to be plural.

Figure 5C:
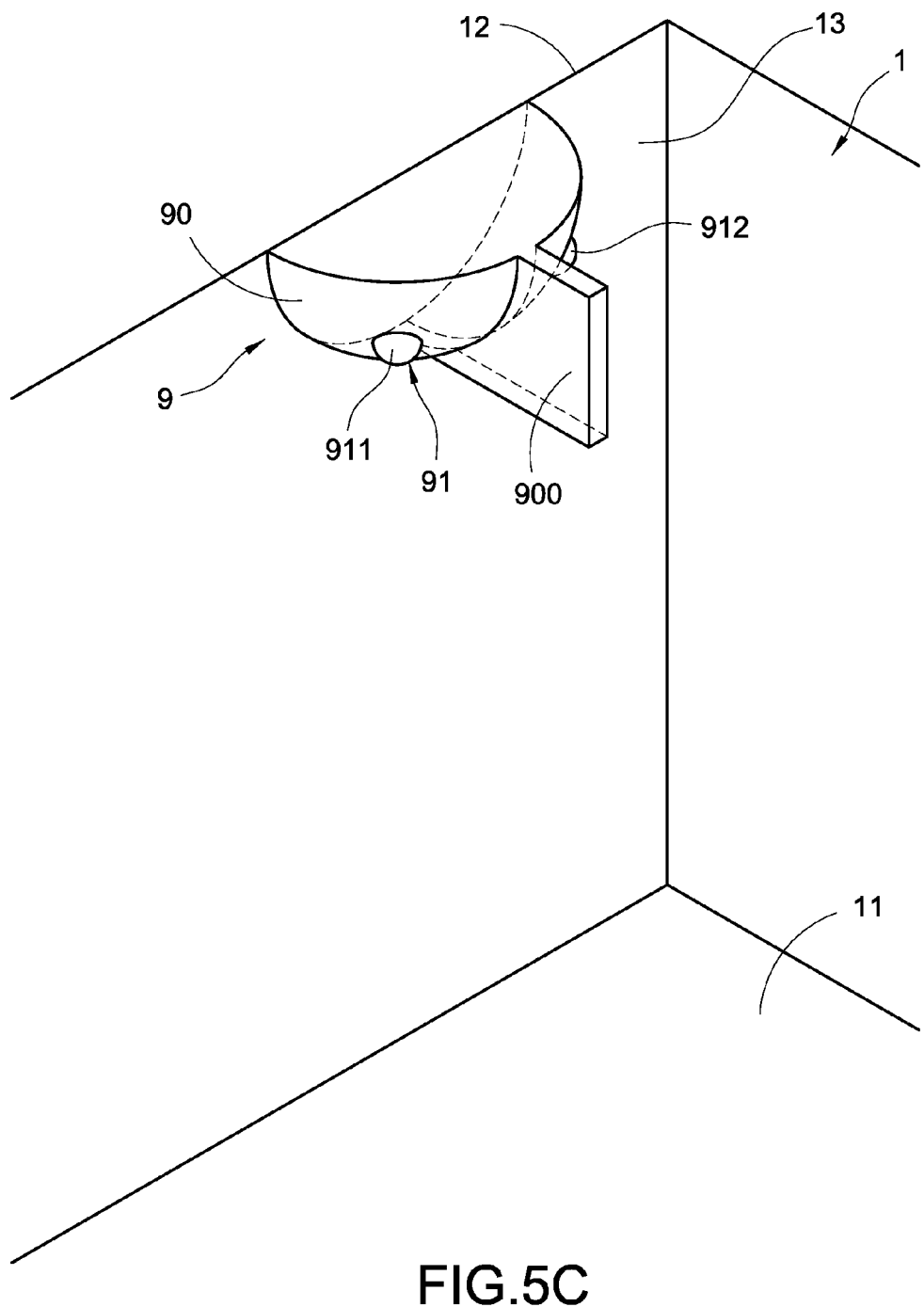
FIG. 5C is an appearance view of positioning device of a third embodiment according to the present disclosure.

FIG. 5C is an appearance view of positioning device of a third embodiment according to the present disclosure. FIG. 5C discloses another positioning device 9, which has the same components as the above discussed positioning devices 5, 7, 8. As shown in FIG. 5C, the positioning device 9 comprises a housing 90, a plurality of light-sensitive units 91 and one separating mechanism 900. The difference between the positioning device 9 and the positioning devices 7 and 8 is that the positioning device 9 is in a fan shape, and is arranged on a junction of the ceiling 12 and a wall 13. The positioning device 9 in this embodiment only has one separating mechanism 900 arranged on a side face of the housing 90, and the separating mechanism 900 thereon separates two sensitive areas for the positioning device 9.

The positioning device 9 comprises two light-sensitive units 91 including a first light-sensitive unit 911 and a second light-sensitive unit 912. The two light-sensitive units 911 and 912 are respectively arranged on the two sensitive areas for representing two different directions (such as left side and right side).

In this embodiment, the positioning device 9 is arranged on the junction of the ceiling 12 and the wall 13, so the positioning device 9 can separate the two sensitive areas through only one separating mechanism 900 arranged on the housing 90, and the positioning device 9 arranges the two light-sensitive units 911, 912 respectively on the two sensitive areas. In other words, in the technical solutions of the present invention, the amount of the light-sensitive units 51, 71, 81, 91 needs to be plural, but the amount of the separating mechanisms 700, 800, 900 can be odd or plural, not limited thereto.

Figure 7:
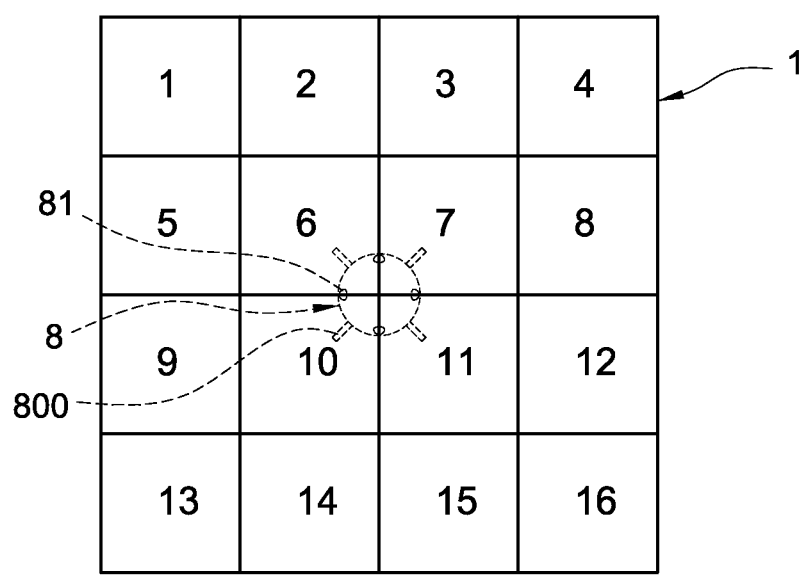
FIG. 7 is a schematic diagram showing plane array of a first embodiment according to the present disclosure.

FIG. 7 is a schematic diagram showing plane array of a first embodiment according to the present disclosure. The embodiment shown in FIG. 7 uses the above mentioned positioning device 8 to describe an example. As shown in FIG. 7, the positioning device 8 separates the indoor space 1 into four sensitive areas via the four separating mechanisms 800 and the four light-sensitive units 81, and further divides the indoor space 1 into multiple cleaning areas via an array function in accordance with the actual size of the indoor space 1. FIG. 7 shows sixteen cleaning areas for example, but not limited thereto.

When calculating the related position of the sweeper 6 based on the vertical distance L1, the oblique distance L2 and the parallel distance L3, the positioning device 8 can also transforms the related position into one of the multiple cleaning areas, and tells the sweeper 6 directly its current cleaning area. Therefore, it is helpful for the sweeper 6 to raise its cleaning efficiency, and prevents the sweeper 6 from cleaning the same cleaning area over and over again.

Besides, in other embodiments, the sweeper 6 can pre-store the multiple cleaning areas related to the indoor space 1. Therefore, after receiving the related position from the positioning device 8, the sweeper 6 itself can determine its current cleaning area by reference to the related position.

It should be mentioned that the positioning device 8 can execute the positioning actions for several sweepers 6 at the same time, and respectively calculate the related position of each of the several sweepers 6 opposite to the positioning device 8. In particularly, if there are several sweepers 6 put in the indoor space 1, the positioning device 8 will tell each of the several sweepers 6 their current cleaning area separately, and instruct each of the several sweepers 6 the next cleaning area they need to clean separately. As such, the several sweepers 6 in this embodiment can actually achieve the purpose of division, and the problem that each of the several sweepers 6 may clean the same cleaning area and cause the cleaning time cannot be reduced is solved.

It should be mentioned that if the system comprises several sweepers 6, each of the several sweepers 6 needs to be arranged the lighting component 61 emitting lights with different wavelengths. Therefore, after receiving the light, the positioning devices 5, 7, 8, 9 can determine the received light is emitted from which sweeper 6 based on the wavelength of the received light. In other embodiments, those sweepers 6 can be arranged the lighting component 61 with same wavelength, and each sweeper 6 respectively controls the lighting component 61 to shine in different frequency through by the processor 62. Therefore, after receiving the light, the positioning devices 5, 7, 8, 9 can determine the received light is emitted from which sweeper 6 based on the shine frequency of the received light.

Figure 8:
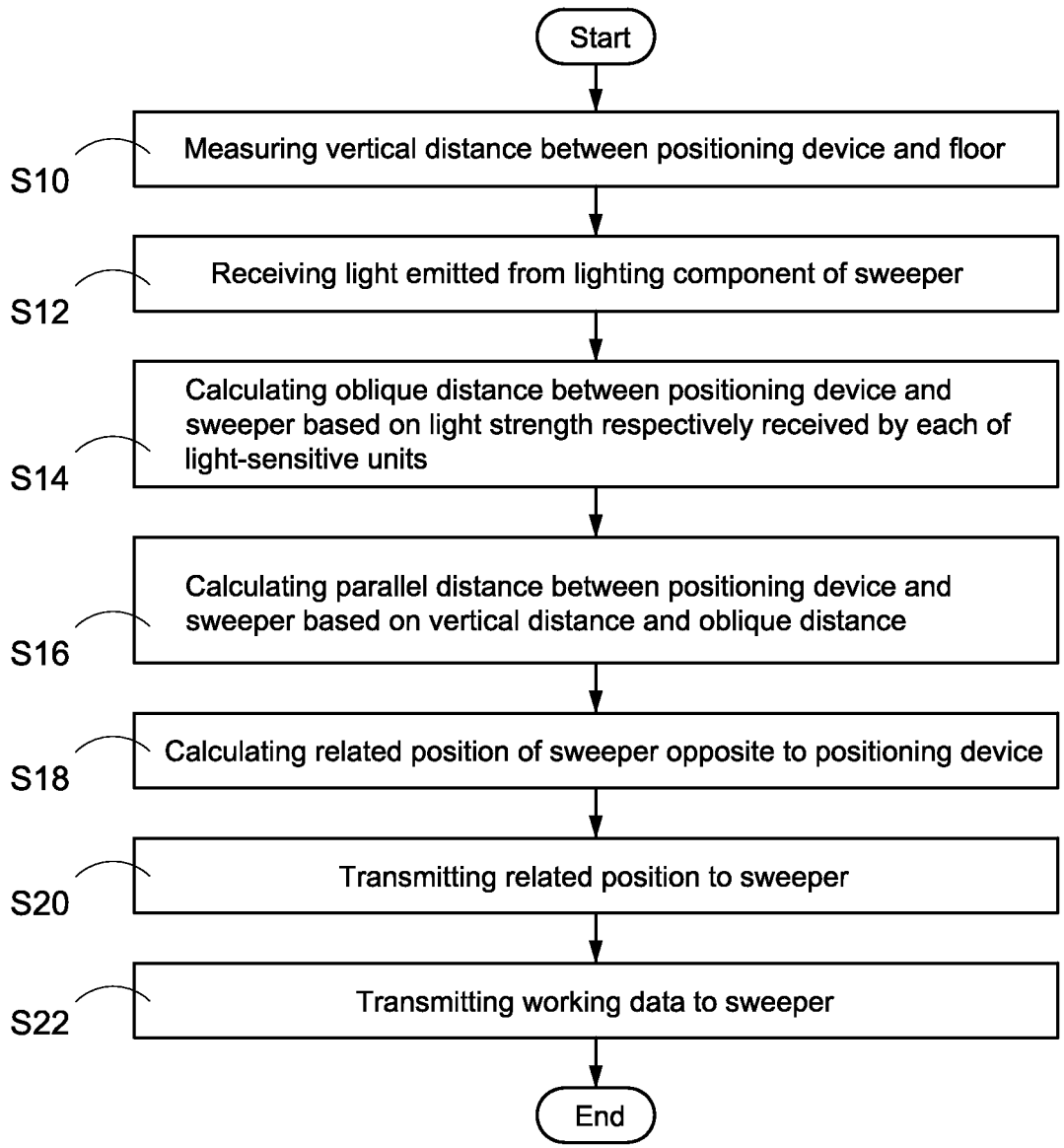
FIG. 8 is a positioning flowchart of a first embodiment according to the present disclosure.

FIG. 8 is a positioning flowchart of a first embodiment according to the present disclosure. FIG. 8 discloses a positioning method of the present invention, and the positioning method is applied to the above described sweeper 6 and positioning devices 5, 7, 8, 9 (the positioning device 8 will be used to describe an example in this embodiment hereinafter).

Firstly, after the positioning device 8 boots, it measures the vertical distance L1 between the positioning device 8 and the floor 11 through the height measuring unit 51 (step S10), and receives the light emitted from the lighting component 61 of the sweeper 6 through the plurality of light-sensitive units 51 respectively (step S12). In this embodiment, the step S10 and the step S12 do not have the execution order, the positioning device 8 can execute the step S10 at first and then execute the step S12, or execute the step S12 in advance and execute the step S10 behind, or even execute the two steps in the meantime, not limited thereto.

After completing the step S10 and the step S12, the positioning device 8 calculates the oblique distance L2 between the positioning device 8 and the sweeper 6 based on the different light strengths respectively received by each of the plurality of light-sensitive units 81 (step S14). In this embodiment, the oblique distance L2 comprises the linear distance between the positioning device 8 and the sweeper 6, and the direction of the sweeper 6 opposite to the positioning device 8.

After the positioning device 8 obtains the above vertical distance L1 and oblique distance L2, it then calculates the parallel distance L3 between the positioning device 8 and the sweeper 6 based on the vertical distance L1 and the oblique distance L2 (step S16). Also, the positioning device 8 calculates the related position of the sweeper 6 opposite to the positioning device 8 based on the parallel distance L3 and the direction of the sweeper 6 opposite to the positioning device 8 (step S18).

Finally, the positioning device 8 transmits the calculated related position to the sweeper 6 (step S20), therefore, the sweeper 6 can execute the further cleaning actions according to the related position. Else, the positioning device 8 can transform the related position into the above mentioned cleaning area and then transmit the cleaning area directly to the sweeper 6, not limited thereto. In this embodiment, the positioning device 8 can also transmit the working data 552 to the sweeper 6 after completing the positioning actions depending on the actual demand (step S22), so as to tell the sweeper 6 which cleaning areas are already cleaned, and which are not.

The positioning system and the positioning method in this invention use the low cost components, such as lighting components, sensitive components, separating mechanisms, to achieve high accurate positioning effect, raise the cleaning efficiency of the sweeper, and reduce the cleaning time needed by the sweeper.

As the skilled person will appreciate, various changes and modifications can be made to the described embodiment. It is intended to include all such variations, modifications and equivalents which fall within the scope of the present invention, as defined in the accompanying claims.

What is claimed is:

1. A positioning system, comprising:
a sweeper having a lighting component; and
a positioning device having a height measuring unit and a plurality of light-sensitive units and arranged on a ceiling, measuring a vertical distance between the positioning device and a floor through the height measuring unit, receiving light emitted from the lighting component through the plurality of light-sensitive units and calculating an oblique distance between the positioning device and the sweeper based on light strengths respectively received by each of the plurality of light-sensitive units, wherein the positioning device calculates a parallel distance between the positioning device and the sweeper based on the vertical distance and the oblique distance.

2. The positioning system of claim 1, wherein the oblique distance comprises a linear distance between the positioning device and the sweeper, and a direction of the sweeper opposite to the positioning device, and the positioning device calculates a related position of the sweeper opposite to the positioning device based on the direction and the parallel distance.

3. The positioning system of claim 2, wherein the sweeper comprises a wireless transmission module, the positioning device comprises a wireless transmission unit, and the positioning device transmits the related position to the sweeper through the wireless transmission module and the wireless transmission unit.

4. The positioning system of claim 2, wherein the sweeper comprises a shell, and the lighting component is arranged on a top face of the shell.

5. The positioning system of claim 4, wherein the lighting component is light emitting diode (LED), and if an amount of the lighting component is plural, the plurality of lighting components have same wavelength.

6. The positioning system of claim 5, wherein an amount of the sweeper is plural, and each lighting component of each sweeper respectively has different wavelength.

7. The positioning system of claim 5, wherein an amount of the sweeper is plural, and each lighting component of each sweeper respectively emits light in different frequency.

8. The positioning system of claim 2, wherein the positioning device further comprises:
a memory unit storing a calculating program; and
a processing unit electrically connected with the height measuring unit, the plurality of light-sensitive units and the memory unit, the processing unit calculating the vertical distance, the oblique distance, the parallel distance, the direction and the related position through executing the calculating program, wherein the calculating program calculates the parallel distance by executing a trigonometric conversion based on the vertical distance and the oblique distance.

9. The positioning system of claim 2, wherein the positioning device comprises a housing, the height measuring unit is arranged on a bottom of the housing and exposed out of the housing.

10. The positioning system of claim 9, wherein the height measuring unit is infrared transceiver, and the positioning device emits downward an infrared to the floor through the infrared transceiver to calculate the vertical distance based on reflection information.

11. The positioning system of claim 2, wherein the positioning device comprises a housing and at least one separating mechanism arranged on a side face of the housing, the separating mechanism separates multiple sensitive areas for the positioning device, the plurality of light-sensitive units are respectively arranged on the multiple sensitive areas, and an amount of the plurality of light-sensitive units is according to that of the multiple sensitive areas.

12. A positioning method of a positioning system, the positioning system comprising a sweeper having a lighting component and a positioning device having a height measuring unit and a plurality of light-sensitive units, wherein the positioning device being arranged on a ceiling, and the positioning method comprising:
a) measuring a vertical distance between the positioning device and a floor through the height measuring unit;
b) receiving light emitted from the lighting component through the plurality of light-sensitive units;
c) calculating an oblique distance between the positioning device and the sweeper through light strengths respectively received by each of the plurality of light-sensitive units; and
d) calculating a parallel distance between the positioning device and the sweeper based on the vertical distance and the oblique distance.

13. The positioning method of claim 12, wherein the oblique distance comprises a linear distance between the positioning device and the sweeper, and a direction of the sweeper opposite to the positioning device, and the positioning method further comprises a step e): calculating a related position of the sweeper opposite to the positioning device based on the direction and the parallel distance.

14. The positioning method of claim 13, wherein further comprises a step f): transmitting the related position from the positioning device to the sweeper.

15. The positioning method of claim 14, wherein further comprises a step g): transmitting a working data from the positioning device to the sweeper, wherein the working data comprises finished tasks and unfinished tasks of the sweeper.

16. The positioning method of claim 13, wherein the positioning device comprises a housing and at least one separating mechanism arranged on a side face of the housing, the separating mechanism separates multiple sensitive areas for the positioning device, the plurality of light-sensitive units are respectively arranged on the multiple sensitive areas, and an amount of the plurality of light-sensitive units is according to that of the multiple sensitive areas.

* * * * *